July 14, 1936.  W. C. COLEMAN  2,047,172
COFFEE MAKING DEVICE
Filed May 18, 1934  4 Sheets-Sheet 1
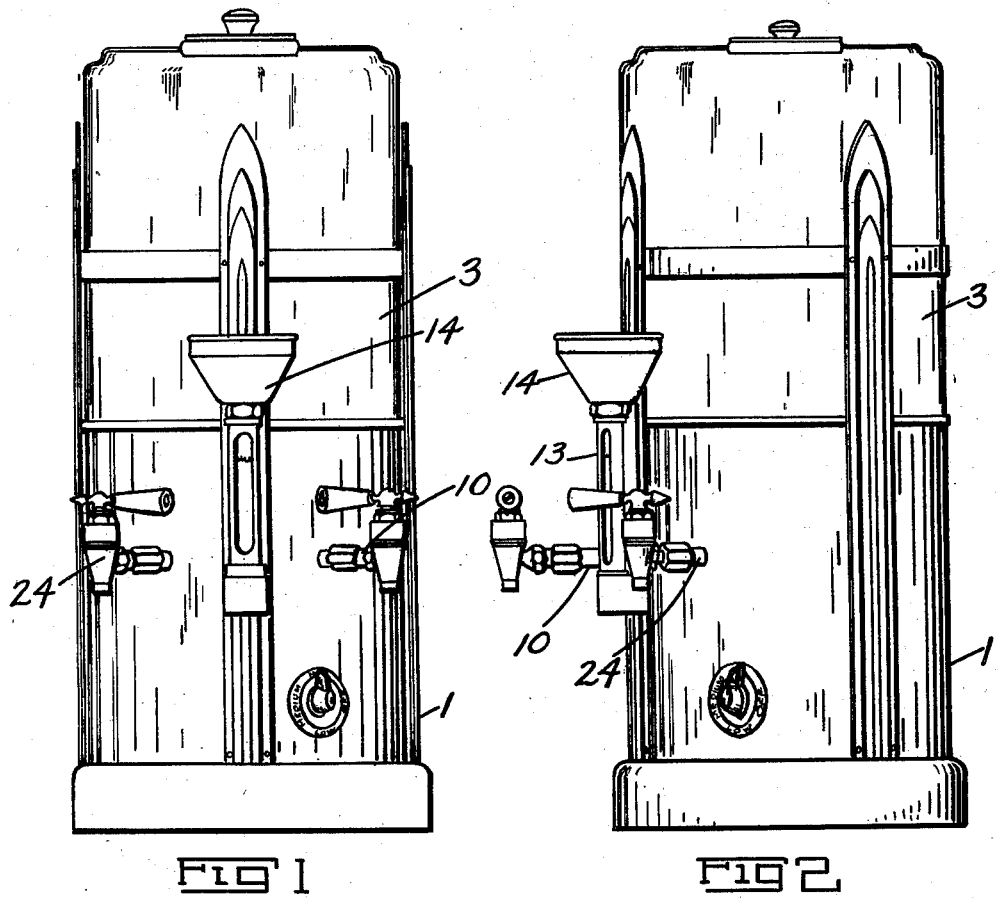
INVENTOR.
W. C. COLEMAN.
BY B. F. Funk
ATTORNEY.

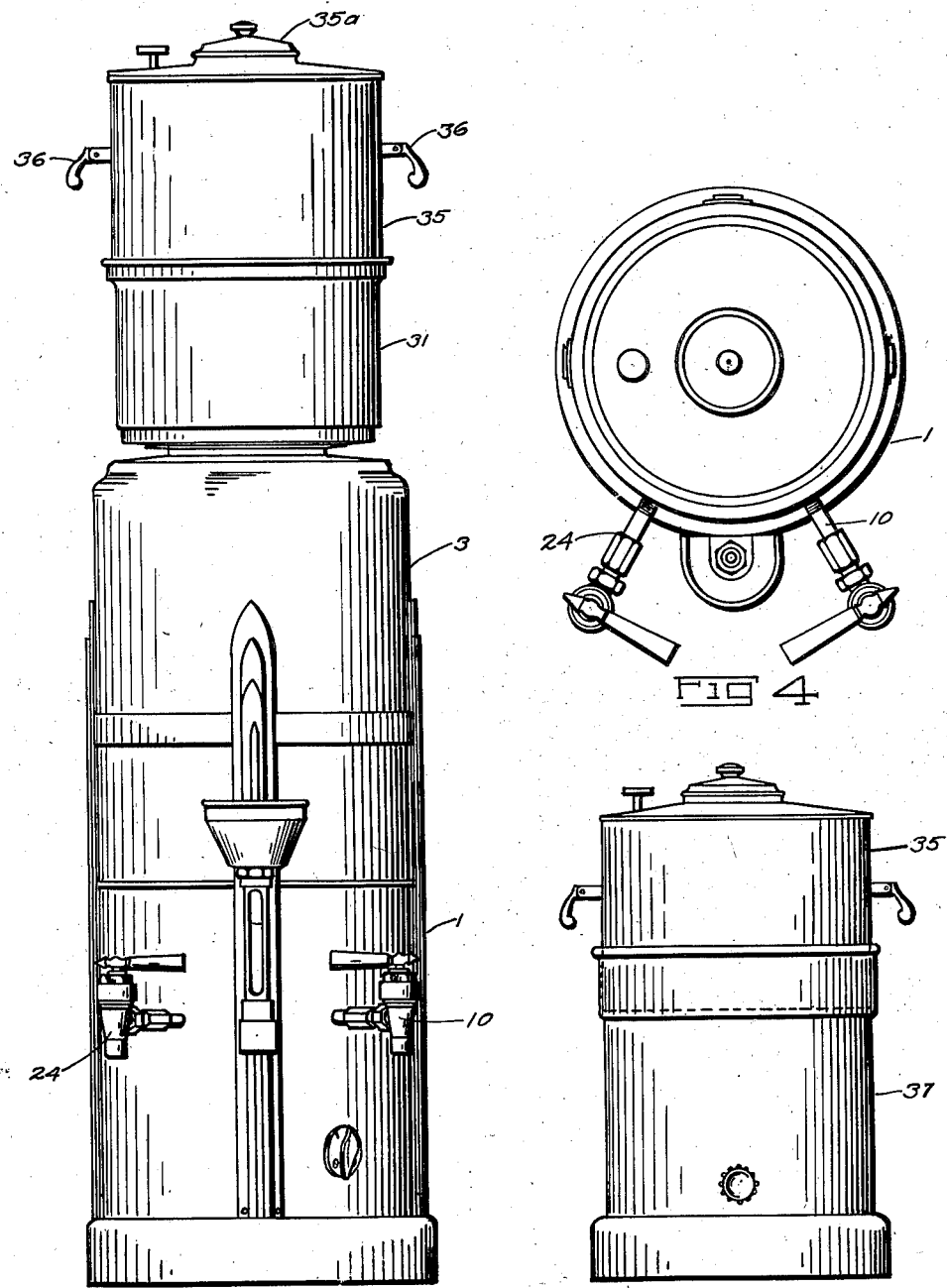

July 14, 1936.  W. C. COLEMAN  2,047,172
COFFEE MAKING DEVICE
Filed May 18, 1934     4 Sheets-Sheet 3
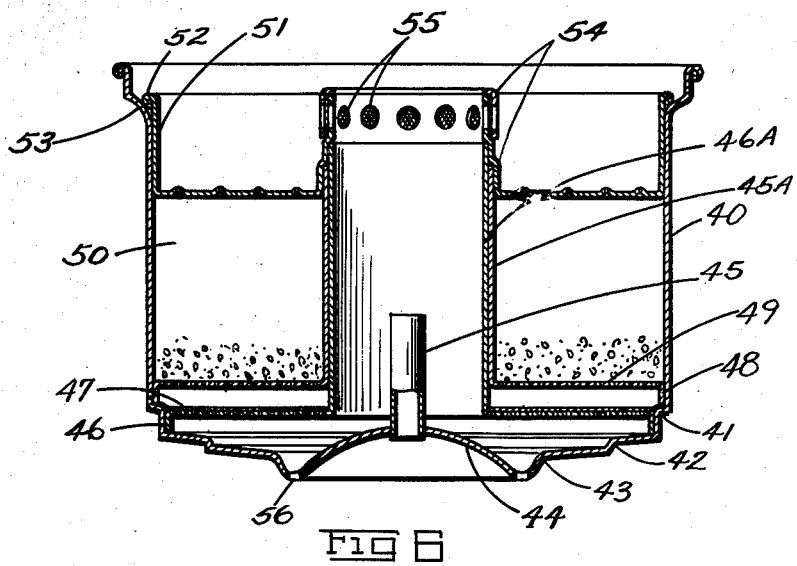
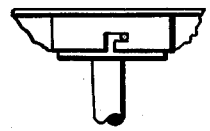
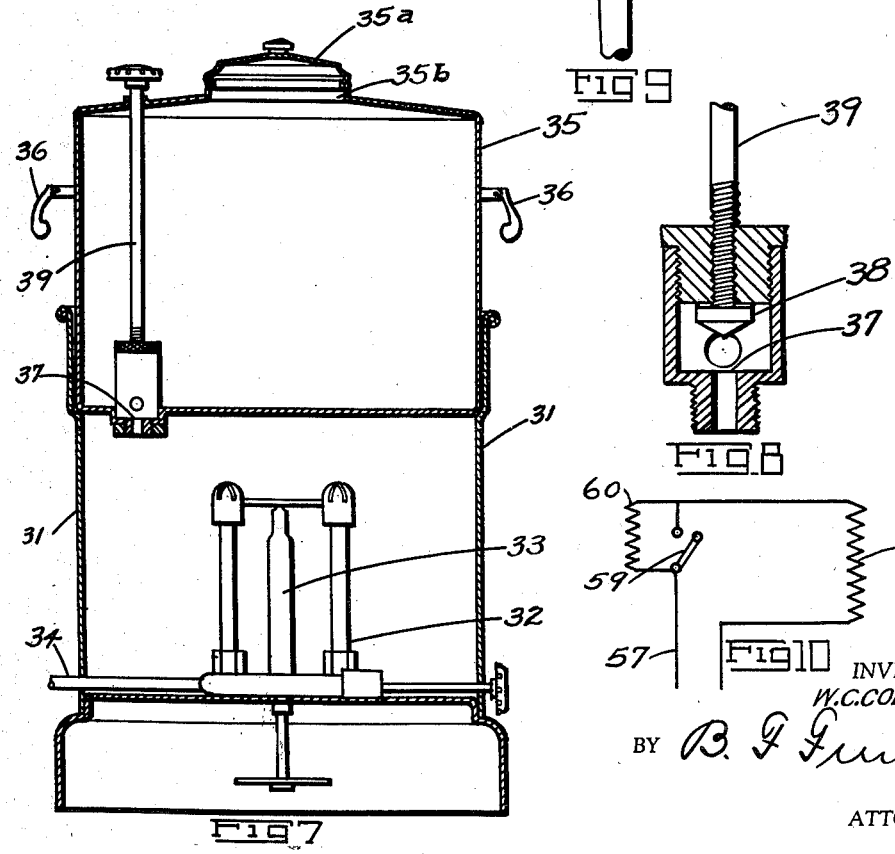
INVENTOR.
W.C.COLEMAN.
BY B. F. Funk
ATTORNEY.

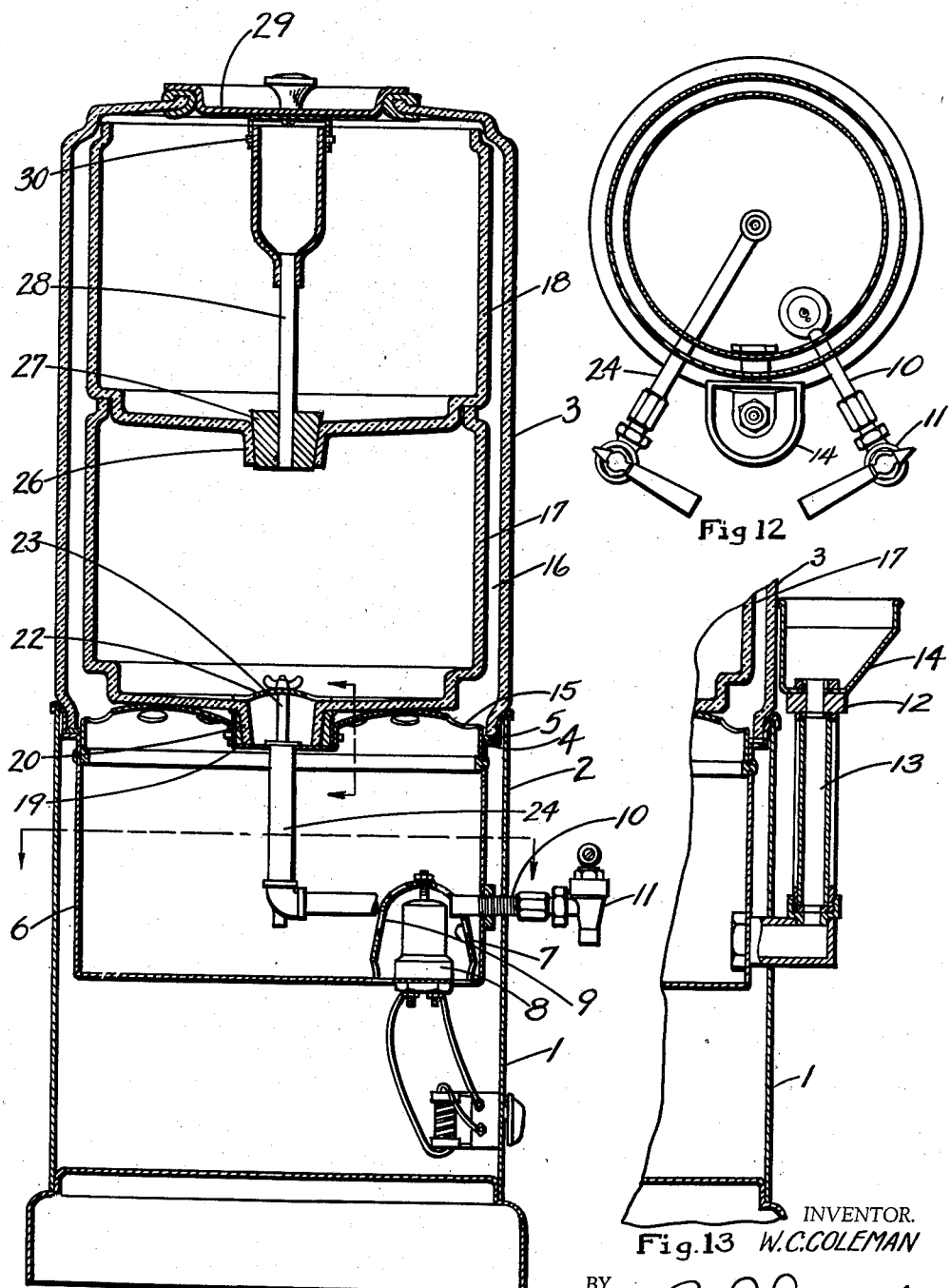

Patented July 14, 1936

2,047,172

UNITED STATES PATENT OFFICE

2,047,172

COFFEE MAKING DEVICE

William C. Coleman, Wichita, Kans., assignor to The Coleman Lamp and Stove Company, Wichita, Kans., a corporation of Kansas Application May 18, 1934, Serial No. 726,208

2 Claims. (Cl. 53—3)

This invention relates to the art of making coffee and particularly to an apparatus which will produce an ideal coffee beverage.

In so far as I have been able to ascertain, it has generally been the practice to depend upon the time of contact of the water with the ground coffee bean to obtain desirable strength and flavor for the finished brew. I have found however that the best results can be obtained only by controlling the temperature of the water at time of contact of the water with the coffee and contacting the water with the coffee in such manner that there will be no agitation of the ground coffee and consequently no washing action of the same. I have also found no method in use which provides any degree of accuracy in time control, an important feature in making coffee.

Temperature of the water at time of contact is important because if the temperature is too high, the objectional constituents of the coffee bean will be liberated in the liquid so that the brew will be tainted with the bitter alkalines and objectionable acids. If the temperature of the water at time of contact is too low the good or desirable constituents of the coffee bean will not be liberated in an expeditious manner. So, I have provided means whereby the coffee will always be contacted by the water within a relatively narrow temperature range, say between 196° and 200° F., this in my opinion, being the ideal range for ground coffee commercially available.

Time of water contact is important because if the water remains in contact with the ground coffee for too long a period, even at ideal temperature, the heavier objectional constituents of the coffee will be carried off into the brew so the coffee brew will have a bitter taste and ofttimes a metallic taste.

Method of contact of the water with the ground coffee bean is important because agitation or washing of the coffee bean should be prevented so that only the desirable constituents of the coffee bean will be liberated.

In short, it is the purpose of my invention to liberate only those desirable qualities of the coffee bean into the brew to the exclusion of the undesirable elements. In order to accomplish this, I have so co-ordinated temperature of water, time of contact with the coffee bean and method of contact that substantially all the desirable elements of the coffee bean are liberated into the brew with the liberation of a minimum of any of the undesirable elements of the coffee bean.

Thus, I am enabled to insure uniform strength and flavor of brew more accurately than has heretofore been possible with the methods of coffee making heretofore practiced.

In considering my invention, it should be borne in mind that commercial coffee has many variables of which a few are: differences in roast, pulverized fineness of grind, the proportion of dust-like fines in the ground coffee and blend of the coffee beans. It is to be understood, of course, that when the burrs in the mill are new and sharp, the coffee will be cut or ground with little dust, but as the burrs wear, the dust content will increase. So in order to obtain the best results under the variable conditions encountered, provision must be made so that these variables do not change the time of contact and method of contact or the temperature. If these provisions are not made, any accuracy of control is well nigh impossible.

It is the purpose of my invention to overcome the above enumerated difficulties and to this end, my invention consists in such steps and apparatus as generically described in the following description and referred to in the appended claims:

In the drawings:—Figure 1 is a front view of the coffee urn,

Figure 2 is a side view thereof,

Figure 3 is a front view of the coffee urn with the boiling water container in place, Figure 4 is a top plan view of the same, Figure 5 is a side view of the boiling water container, Figure 6 is a cross-sectional view of the distributor basket, Figure 7 is a vertical sectional view of the boiling water container and the heater therefor, Figure 8 is a sectional view of the distributor valve, Figure 9 is a detail view of the bayonet joint for the cover, Figure 10 is a wiring diagram for an electric heater for the boiling water container, Figure 11 is a vertical longitudinal sectional view of the coffee urn, Figure 12 is a sectional view on the line 12—12 of Figure 11, and Figure 13 is a vertical sectional view through part of the urn showing the filler and the sight gauge.

In carrying out my invention, I find a convenient apparatus can be constructed as follows: An outside casing 1 is provided with a lower metallic cylindrical member 2 and an upper transparent member 3 closed at its top and having the edge of its open lower end received in the circular seat 4 in the lower member, a rubber gasket 5 serving as a seat for the upper member in such a manner that the inverted jar-shaped upper member 3 may be easily removed.

The lower member 1 of the casing carries a hot water receptacle 6 provided with a localized heating chamber 7 in which is located a heater 8 to locally heat the water at a relatively high temperature, the heated water diffusing with the main body of water through the openings 9. A pipe 10 leads from the localized heating chamber to a faucet 11 outside the casing so that boiling water may be available for the purpose of making tea, or for other purposes.

A combined water filler and sight gauge 12 is connected to the main water chamber with the sight gauge 13 outside of the casing, the filler having a funnel shaped upper end 14 for replenishing the hot water supply.

The top of the receptacle 6 is open as at 15 to permit water vapor to pass up into the space 16 between the coffee beverage receptacles or containers 17 and 18 and the glass member of the outer receptacle, the vapor being effective to insulate the coffee receptacles from the air surrounding the outside casing. The amount of vapor delivered into the space determines the temperature of the receptacle. In the top of the water chamber 6 is a cup-like socket 19 to receive the neck 20 of the lower beverage receptacle or container 17 held on its seat by a spider disc 22 and the bolt 23. A pipe 24 leads from the socket to a faucet 24 outside the casing so that the beverage can be delivered. The upper glass coffee container 18 is nested upon the edge of the top of the lower coffee receptacle and it is provided with an inverted neck 26 to receive a stopper or valve 27 having a stem 28 connected to the cover or cap 29 in the outside casing member 3 by a bayonet joint 30 so that the cover can be used to lift the stopper out of the neck so it can be removed without disturbing the stopper.

The apparatus is so constructed that small quantities of coffee can be made from time to time so as to always have a fresh supply (it being understood that coffee beverage which "stands" too long becomes "flat" or loses its aromatic qualities).

Therefore, in one development of the device, I have arranged the two coffee receptacles so that when the coffee in the lower container is being served, a fresh batch of the brew can be in process of making in the upper container, ready to be delivered into the lower container when occasion demands and since the vapors from the water receptacle will maintain the temperature of the liquid in the two upper containers, danger of the coffee brew becoming cold will be avoided. The temperature of the container is maintained by the temperature of the vapor delivered to this receptacle.

The water heater is best shown in Figures 5 and 7 and 8 and it consists of a hollow casing 31 with an open top and in the lower portion is a burner 32 having a pilot 33 as will be well understood the fuel being supplied through a supply pipe 34. A hot water boiler 35 having handles 36—36, is receivable upon the top edge of the hollow casing 31 and it is provided with a cover 35a to normally close the opening 35b. In the bottom of the boiler is a valve seat 37 normally closed by a valve 38 having a stem 39 projecting through the top of the boiler and having a handle or knob by which the valve may be turned to open the port 37 so as to discharge water into the basket or filtering unit containing the ground coffee.

The coffee basket or basin is an important part of the invention since it is provided with means to receive the water at boiling temperature and reduce the temperature before it contacts with the coffee for the desired period of time, and in such manner that the undesirable constituents will not be unduly liberated into the brew.

As shown the basin 40 has a vertical cylindrical wall provided at its lower end with annular shoulders 41, 42 and 43, and an inverted concave central bottom portion 44 having an upstanding outlet tube 45 at its center. Resting upon the shoulder 42 is a flanged disc 46 carrying a central tube 45a considerably larger than the tube 45. The disc 46 is perforated and it supports a sheet of filter paper 47 which is held firmly on the disc 46 by the flange 48 of the disc 49 on tube 46a sleeved upon the tube 45a. The flange 48 is shouldered to fit the shoulder 41 tight enough to prevent liquid or water to pass by the flange. The disc 49 is also perforated and it constitutes a coffee support so that the ground coffee is supported a suitable distance above the filter paper, the space being indicated at 50.

The water distributor 51 is cup-shaped and it is shown as having a bead 52 resting upon the shoulder 53 of the basin so it will be held an appreciable distance above the coffee, there being a shouldered sleeve 54 fitting over the tubes 45a and 46a, and extending a suitable distance above them, the upper portion of the sleeve 54 having screened openings 55 serving as overflow openings there being a small opening or openings 56 in the lowermost part of the bottom of the basin as a final drain therefor.

It is to be observed that the coffee basket or basin 40 is provided with the shoulders 41, 42, 43, in stepped relation so that the shoulder 43 can rest on the coffee making receptacle and the shoulder 42 provides a support for the flange 46 of the flange member which carried the tube 46a. The floor 49 of the coffee supporting tray spaces from 46 which carries a filter paper. When water is supplied to the distributor 51 it will flow through the openings at a definite rate so as the water is poured into the water distributor a supply head will accumulate and any overflow will pass through openings 55 down through the tube 46a and as a head forms in the bottom of the basket the water will overflow through tube 45 when the level in the basket is such that water in seeking its level will pass up through the filter paper and into the coffee. The holes in the distributor 51 are such that water is fed at a definite rate of flow over the coffee in relatively fine streams so that there will be no appreciable agitation of the coffee and the water which is passed through the coffee will be free to gravitate on to the filter papers where the fines can be removed before the brew passes into the receptacle. There is a special advantage in having coffee held above the filter papers because this arrangement permits a free flow of water through the coffee and prevents ground coffee, when wet, from packing on the filter paper and clogging.

The basket shown in Figure 6 with its appurtenances is made proportionately larger than the receptacle which is to support it. This is for the purpose of clearness but the arrangement of coffee urn, basket and water supplying boiler is shown in Figure 3 in which the parts are properly proportioned.

I will now describe the method of operating the apparatus.

Assuming that the boiler contains the correct amount of boiling water and that the coffee basin with ground coffee on support disc 49 rests upon the top of the outer casing 1, the boiler is set upon the edge of the basin, and the valve 38 is opened to permit water to flow over the perforated distributor 51 to pass down into the coffee in coffee space 50. The size of the valved outlet for the boiler is predetermined and balanced with the cooling capacity of the basin or filtrating unit. During the first minute of delivery, the boiling water is cooled about thirty degrees in heating all parts of the filtrating unit. This temperature is too low to make good coffee, but it is useful in soaking the grounds, any excess water filtering into the beverage chamber below. During the second minute of water delivery, the water is cooled about 16 degrees, but in doing so, all parts of the basin or filtrating unit is heated to the desired coffee-making temperature and provides a nicely balanced relation between temperature of water in the container, the rate of flow out of container, the time water remains in the cooling pan or distributor and ventilation provides for vapor escape. The resultant is the provision of the essential temperature of water at the coffee grounds of 196 degrees to 200 degrees F.

The time the water remains in the pan or distributor will, of course, depend upon the size of the pan and the number and sizes of the drip openings in the bottom thereof. For a six-quart hot water boiler (a nine and one-half inch pan), I recommend eighty-four outlets of .040" diameter.

The ventilation for the cooling pan or distributor is provided by spacing the hot water container or boiler slightly above the distributor, either by providing legs on the boiler or by other suitable means. About an eighth inch space all around the rim of the cooling pan is good practice but the space may be varied for different sizes of apparatus and for different boiling temperatures due to altitude of location.

The device is so constructed that the time of contact of the hot water with the ground coffee varies from five to eight minutes to compensate for difference in fineness of grind and degree of roast.

By changing the effective port area of drain opening 56, the rate of flow through the filtrating unit can be controlled over a range of from five to eight minutes. This can be accomplished by having interchangeable plugs in openings 56 with different sized port openings and attention is called to the fact that the overflow tube 42 maintains the level of water in the coffee space slightly above that of the coffee while the rate of discharge of the infusion is controlled by the opening 56. The size of this discharge can vary from six sixty-fourths to ten sixty-fourths of an inch with good results, but I do not want to be limited to this exact range, the essential condition being that there will be complete infusion of the coffee grounds with water for a definite length of time.

Since the water will rain down upon the coffee grounds so gently that there will be no washing action or turbulence of the coffee grounds, it follows that danger of washing out the objectionable constituents of the coffee bean will be avoided, so practically none of the bitter alkalines and metallic tasting acids will be present in the brew. On the other hand, I have found that practically all the desirable constituents of the coffee bean can be liberated by the apparatus above described.

Attention is called to the fact that when it is desirable to wash the coffee container or to have access thereto for other purposes, it will only be necessary to lift off the glass member of the outer casing, lift off the upper coffee container and if the lower coffee container is to be removed, loosen the wing nut 23.

It will therefore be seen that the apparatus may be easily assembled and disassembled and that the coffee container can be maintained in a sanitary condition in a most convenient manner; an important feature in devices of this kind.

My experiments have shown that temperature of water contacting the coffee and time of contact in properly balanced relation is highly important in the making of coffee beverage and the resultant brew is further enhanced if the water contacts with the coffee without turbulence and so far as I know, I am the first to make coffee with an apparatus and by a method where the ideal conditions can be assured for each coffee making operation, as the control of temperature, time and method of contact is inherent in the device and not by human manipulation during the coffee making period.

What I claim as new is:

1. The process of brewing a coffee beverage which consists in providing a body of ground coffee in filtrating formation so that water may gravitate through it, continuously delivering boiling water into a relatively flat zone spaced above the ground coffee, discharging the water from the bottom of the zone in segregated portions at a predetermined rate of discharge and distributing same over the body of the ground coffee, the boiling water being delivered to the zone substantially as fast as water is delivered therefrom to the ground coffee to maintain a substantial depth of water in the zone throughout the major part of the process, the horizontal spread and the depth of the water maintained in the zone and the volumetric rate of discharge being such that the boiling water flowing continuously into the zone will be reduced in temperature from 10° F. to 15° F. when it is discharged onto the body of ground coffee, gravitating the water thus cooled through the ground coffee and collecting the resultant brew.

2. The process of brewing a coffee beverage which consists in providing a body of ground coffee supported in filtrating formation to offer slight resistance to water passing therethrough, providing a supply of boiling water and continuously flowing the required amount of this water at a predetermined volumetric rate into a cooling zone spaced above the body of ground coffee, the water within the zone having a horizontal spread and exposed surface, a substantial vertical depth, and a predetermined volumetric discharge therefrom to effect a temperature drop in the water while passing through the zone of from 10° F. to 15° F., gravitating and distributing the water as it is thus reduced in temperature onto the body of ground coffee, filtering the water through the ground coffee in a predetermined time as required by the character of the grind and the degree of the roast, and gathering the resultant coffee brew.

WILLIAM C. COLEMAN.